Feb. 17, 1953   N. E. ANDERSON   2,629,071
STABILIZING WELDING ARC
Filed July 31, 1948
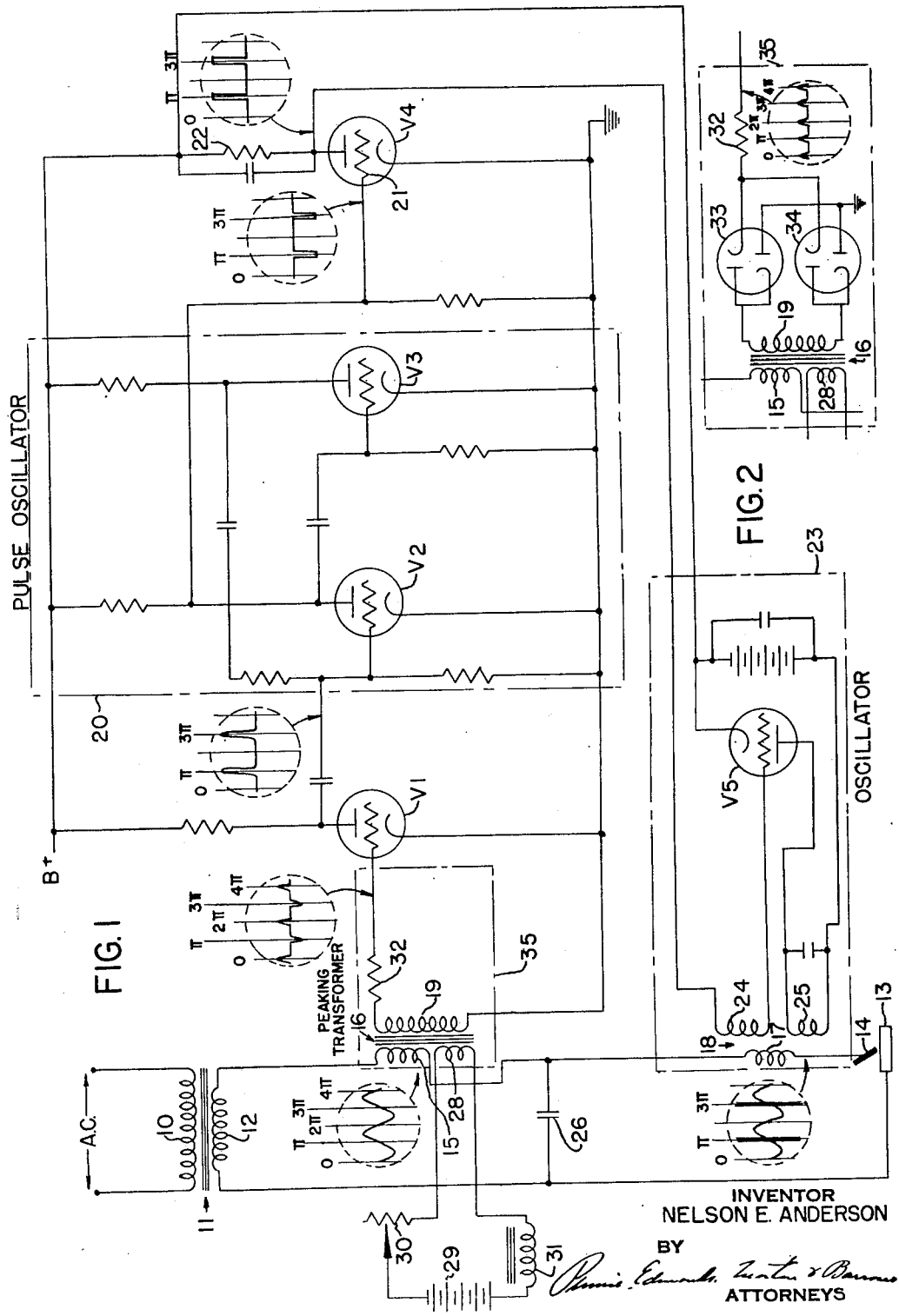
INVENTOR
NELSON E. ANDERSON
BY
ATTORNEYS Patented Feb. 17, 1953

2,629,071

UNITED STATES PATENT OFFICE 2,629,071

STABILIZING WELDING ARC

Nelson E. Anderson, Scotch Plains, N. J., assignor to Air Reduction Company, Incorporated, a corporation of New York Application July 31, 1948, Serial No. 41,761

16 Claims. (Cl. 315—170)

This invention relates to alternating-current arc welding, and more especially to methods and means for stabilizing the arc.

It is well known that there is a tendency in alternating-current arc welding systems for the arc to break or to become extinguished when the welding current is passing through zero value. It has been proposed that such arcs be stabilized by superimposing a high-frequency voltage on the alternating welding current which is customarily of low commercial frequency. The high-frequency current may be furnished at a voltage considerably higher than that of the welding current, but may be of extremely low current value compared with the magnitude of the welding current.

In accordance with the present invention the stabilizing voltage is generated preferably by a high-frequency oscillator of a type which is simple and economical to manufacture, which is economical of power, generates a wave of substantially pure form which thus can be blocked by simple filters where desired, and which is subject to precise control so that the high-frequency voltage in the form of periodic impulses can be superimposed on the arc circuit at exactly the desired phase and duration of the arc current wave. The invention further includes a method and means for superimposing the stabilizing voltage across the welding electrodes for an extremely short fraction of the entire welding current cycle. For example, by accurate control of high-frequency oscillations in accordance with the invention, satisfactory stabilization results when the stabilizing pulses are superimposed for only about 5% of the welding current cycle, viz., approximately 18° out of 360°. Preferably, the stabilizing pulses may have a duration of the order of 2 to 3 degrees each side of current zero of the welding current. As a result, a great saving in size and original cost, as well as in operating cost, together with improved operation, is effected.

The invention will be better understood by reference to the following description considered in connection with the drawings, wherein:

Fig. 1 comprises a circuit diagram of an arc stabilization system in accordance with the invention; and Fig. 2 illustrates a modification of the system of Fig. 1.

Referring to Fig. 1, the primary winding 10 of a welding transformer 11 is shown as connected across the alternating-current power supply line, here assumed to be of 60 cycles. One terminal of the secondary 12 of the welding transformer is connected to a workpiece 13 and the other terminal is connected to a welding electrode 14. In accordance with the usual welding practice, the welding arc is struck between elements 13 and 14. Connected in series in the welding circuit, which includes secondary 12 and elements 13 and 14, is primary winding 15 of a peaking transformer 16 and the secondary winding 17 of a high-frequency coupling transformer 18.

The secondary winding 19 of peaking transformer 16 is coupled to the input of vacuum tube amplifier $V_1$. The output of amplifier $V_1$ is suitably coupled to a pulse oscillator 20 which may conveniently be of the well-known multi-vibrator type which includes two triodes $V_2$ and $V_3$. This multi-vibrator is designed to have a free running frequency slightly less than the frequency of the welding current, and it is locked in synchronism with the welding current by the synchronising peaks which are received from amplifier $V_1$.

The pulses appearing at the output of the multi-vibrator 20 are impressed upon the grid 21 of another triode $V_4$. Tube $V_4$ as well as the three preceding triodes may comprise any suitable type. Tubes $V_3$ and $V_4$ preferably are of a dual type, such as type 6SN7, and tubes $V_1$ and $V_2$ may likewise be combined in a single dual type of tube such as type 6SN7. Connected in the anode circuit of triode $V_4$ is a resistor 22, across which a biasing potential is developed. An oscillator 23 is connected to be controlled or triggered by the biasing potential developed across resistor 22. This oscillator may be of any desired type but should be subject to accurate control by the apparatus which preceeds it in the circuit, and should preferably be of a type which emits a reasonably pure wave form which may readily be filtered out where desired. The oscillator, as illustrated, is of the well-known tickler feedback type, and oscillator tube $V_5$ therein may, for example, comprise type 3C24. The grid and anode coils 24 and 25 of oscillator $V_5$ are coupled, as shown, to each other and to the secondary 17, as above mentioned. Such an oscillator will produce a single output frequency which is substantially constant, and, as here employed, this oscillator comprises a pulse generator. A bypass condenser 26 of capacitance suitable to prevent the high-frequency oscillations of the pulses from flowing in the low-frequency windings of transformers 16 and 11 is preferably connected, as shown, to shunt those windings.

Although experiments demonstrate that satisfactory arc stabilization is not, in general, dependent on the frequency, an oscillator frequency of between 2 and 3 megacycles has been found desirable in order to minimize the physical size of the circuit elements. In certain locations the nature of the source of stabilizing voltage pulses, especially as to frequency, if it be alternating current, may well be dictated by the necessity of avoiding interference with nearby radio communication or other apparatus.

An auxiliary winding 28 coupled to primary and secondary windings 15 and 19 of transformer 16 is connected to a suitable source 29 of direct current through a variable resistor 30 and an alternating-current choke 31.

The functions and nature of the apparatus above described will be better understood from the following description of the operation of the stabilizing system of the invention.

The iron core of the peaking transformer 16 saturates readily, so that when low-frequency welding current passes through primary 15 of this transformer (see waveform to the left of primary 15) the transformer flux changes during only a small portion of each half cycle, viz., the welding current reversal periods, which are those portions of the welding current cycle when the value of the instantaneous welding current is small. As a result, alternating positive and negative peaks of synchronizing voltage are induced in the secondary winding 19 as indicated by the waveform drawn to the left of tube $V_1$. This means for generating voltage peaks to control or time voltage pulses of a different form which in turn are employed to stabilize a welding arc comprises an important aspect of the invention. The peaks from winding 19 are normally of such magnitude that the negative peak will be suppressed by the inherent rectifying action of tube $V_1$ so that the amplifier output is of the nature shown in the waveform drawn to the right of tube $V_1$. From this waveform it will be noted that the peaks are amplified and appear at the rate of one per cycle of the original wave of the welding current in the primary of transformer 16.

The voltage peaks appearing at the output of tube $V_1$ are fed into the circuit of multi-vibrator 20 which here functions as a pulse-forming network. This multi-vibrator, being in effect a relaxation oscillator, will produce one pulse, more nearly of the square wave type, for each of the sharper potential peaks received from tube $V_1$, and these square wave pulses, shown to the left of tube $V_4$, are locked in synchronism with the peaks from tube $V_1$. As shown in the drawing, the output pulses from the multi-vibrator circuit are of opposite sign from the peaks impressed upon the input of the relaxation oscillator and have the same duration as the periods of the desired oscillations to be impressed upon the welding arc circuit. By impressing these keying pulses on the grid 21 of triode $V_4$, this tube will cause current to flow through anode resistor 22 except when it is cut off by the triggering or keying pulses impressed upon grid 21 thereof. Resistor 22 is effectively connected between the anode and cathode of oscillator tube $V_5$, and is of such magnitude that the potential developed across it prevents tube $V_5$ from oscillating. However, when one of the mentioned keying pulses impressed upon the grid 21 of tube $V_4$ biases that tube to cutoff, the anode current through resistor 22 is consequently cut off, and oscillator $V_5$ will produce oscillations and will continue to do so until tube $V_4$ again conducts anode current at the end of the keying pulse. As a result of the foregoing operation, a pulse of high-frequency waves will be superimposed upon the arc welding circuit for approximately 18° to 20°, or less, out of each 360° cycle, at and near the zero value phase of the welding current, as shown by the waveform drawn to the left of the transformer 18. Thus, this oscillator is of the low-duty type by which is effected a considerable saving in the cost of the apparatus itself as well as in the power which it consumes.

Preferably the high-frequency pulses may be superimposed once for each cycle of welding current and for a duration of the order of two to three degrees each side of current zero. Because of the method of timing and controlling the high-frequency pulses in accordance with the invention, these pulses will occur at the correct time and for the correct duration regardless of changing welding conditions.

If it be necessary to change the time of the keying pulses, viz., the phase of the welding current cycle at which the high-frequency pulses are superimposed, such change can be effected by adjustment of resistor 30, seen at the left of the diagram. Adjustment of this resistor varies the direct-current flowing through auxiliary coil 28 which is in magnetic relation to the core of peaking transformer 16. Thus by changing the degree of initial magnetic saturation of the transformer core, the phase in the current cycle at which it becomes entirely saturated is shifted, and this results in a change of the timing of the high-frequency pulse with respect to the phase of the welding current.

In the use of the usual alternating-current welding equipment satisfactory synchronization results from the use of pulses as above described. However, under certain limited conditions, and especially when unusually low frequency welding current is employed, it may become necessary to superimpose the high-frequency pulses during each half cycle for a very short interval instead of once per cycle, as above described. To effect this change, it is necessary only to furnish to the pulse oscillator or multi-vibrator 20, twice as many control pulses in the same time interval. For this purpose a network which will pass both positive and negative pulses, as shown within rectangle 35 may be substituted for that within the rectangle 35 of Fig. 1. This modification includes the connection of a full-wave bridge type rectifier comprising double diode tubes 33, 34 between secondary coil 19 and resistor 32. The waveform at the right of resistor 32 of Fig. 2 shows that the resulting pulses occur every half cycle.

What I claim is:

1. The method of stabilizing an electric welding arc which includes, generating from the welding current an alternating synchronizing voltage having peaks corresponding to the current reversal intervals of the welding current, forming pulses timed by certain peaks of said synchronizing voltage, generating high-frequency oscillations of a substantially single constant frequency, controlling the timing of said oscillations by said pulses to form impulses of high-frequency oscillations of substantially constant frequency, and superimposing said high-frequency impulses on the arc.

2. The method of stabilizing an electric welding arc which includes, generating from the welding current an alternating synchronizing voltage having peaks corresponding to the current reversal intervals of the welding current, forming synchronizing pulses timed by alternate peaks of said synchronizing voltage, generating high-frequency oscillations, forming from said oscillations high-frequency pulses, timing said high-frequency pulses by said synchronizing peaks, and superimposing said high-frequency pulses on the arc.

3. The method of stabilizing a low-frequency electric welding arc which includes the steps of generating high-frequency oscillations derived from the welding current and superimposing said oscillations on said arc only once for each cycle of said current and for a duration of the order of two to three degrees each side of current zero of said welding current.

4. The method of stabilizing a low-frequency electric welding arc which includes the steps of generating from the welding current an approximately sinusoidal voltage wave, producing voltage pulses corresponding to approximately two to three degrees of said voltage wave each side of current zero of said wave, generating high-frequency oscillations in a free oscillator, controlling the oscillation periods of said oscillator by said pulses to produce high-frequency pulses, and superimposing said high-frequency pulses on said arc.

5. The method of stabilizing a low-frequency electric welding arc which includes the steps of generating from the welding current an approximately sinusoidal voltage wave, producing voltage pulses corresponding to approximately two to three degrees of said voltage wave each side of current zero of said wave once per cycle of welding current, generating high-frequency oscillations in a free oscillator, controlling the oscillation periods of said oscillator by said pulses to produce high-frequency pulses, and superimposing said high-frequency pulses on said arc.

6. A system for stabilizing a low-frequency electric welding arc which includes, a low-frequency alternating current arc circuit, a peaking transformer of the saturating core type having a primary winding and a secondary winding, said primary winding being connected in said arc circuit whereby synchronizing-voltage peaks corresponding to current reversal intervals in said circuit are produced in said secondary winding, a source of stabilizing voltage pulses connected to said arc circuit, and timing means connected between said secondary winding and said pulse source which controls the timing of said pulses in accordance with certain of said voltage peaks.

7. A system for stabilizing a low-frequency electric welding arc which includes, a low-frequency arc circuit, a peaking transformer having a primary winding and a secondary winding, an amplifier, said primary winding being connected in said circuit and said secondary winding being connected to the input of said amplifier whereby synchronizing voltage peaks corresponding to current reversal intervals in said circuit are produced in the output of said amplifier, pulse oscillator means controlled by said peaks for generating voltage pulses of sign opposite to that of said peaks, a high-frequency oscillator of which the output is coupled to said arc circuit, and coupling means connected between the output of said pulse oscillator means and said high-frequency oscillator such that said high-frequency oscillator is actuated in pulses corresponding in phase to said current reversal intervals.

8. The method of stabilizing a low-frequency electric welding arc which includes the steps of generating a stabilizing voltage in the form of pulses, limiting each pulse to a duration of the order of five per cent of a cycle of the welding current, synchronizing said pulses with respect to the welding current, and superimposing said pulses on said arc once in each cycle of the welding current including the current zero phase.

9. The method according to claim 8 in which each said pulse which is superimposed on said arc is limited to a duration of the order of two to three degrees each side of current zero of said welding current.

10. The method of stabilizing a low-frequency electric welding arc which includes the steps of generating high-frequency oscillations, forming said oscillations into pulses of a duration of approximately five per cent of each cycle of welding current, synchronizing said pulses in accordance with the phase of the welding circuit current and independently of the phase of the welding circuit voltage, and superimposing said pulses on said arc once each cycle of welding circuit current including the current zero phase.

11. The combination with an electric arc welding system including an arc circuit, of an oscillator, a pulse generator, connections from said generator to said oscillator causing said oscillator to be triggered by said pulse generator, and means coupling the output of said oscillator to the arc circuit to apply periodic pulses thereto.

12. In an electric arc welding system, the combination which includes, an arc circuit, an oscillator, a pulse generator, connections from said generator to said oscillator causing said oscillator to be triggered by said pulse generator, means coupling the output of said oscillator to the arc circuit to apply periodic pulses thereto, and means for adjusting the timing of said pulses with respect to the phase of the current in the arc circuit.

13. The combination with a low-frequency electric arc welding system which includes an arc circuit, of a relaxation oscillator, and a pulse generator comprising a high-frequency oscillator, said pulse generator being triggered by the relaxation oscillator and being connected to apply periodic high-frequency pulses to the arc circuit.

14. The combination with an arc welding system including an arc circuit, of a relaxation oscillator, and a pulse generator triggered by the oscillator connected to apply periodic voltage impulses to the arc circuit.

15. The combination with an arc welding system including an arc circuit, of a relaxation oscillator, a pulse generator triggered by the oscillator connected to apply periodic voltage impulses to the arc circuit, and synchronizing means coupling the arc circuit to said oscillator to control the output thereof.

16. The combination with an arc welding system including an arc circuit, of a relaxation oscillator, a pulse generator triggered by the oscillator connected to apply periodic voltage impulses to the arc circuit, and means for synchronizing said oscillator with respect to the welding current.

NELSON E. ANDERSON.

REFERENCES CITED

The following references are of record in the file of this patent:

UNITED STATES PATENTS

| Number | Name | Date |
|---|---|---|
| 1,351,815 | Von Henke | Sept. 7, 1920 |
| 1,918,963 | Glenn et al. | July 18, 1933 |
| 1,973,122 | Stoddard | Sept. 11, 1934 |
| 1,982,327 | Smith | Nov. 27, 1934 |
| 1,994,907 | Dawson | Mar. 19, 1935 |
| 2,036,233 | Pakala | Apr. 7, 1936 |
| 2,399,331 | Denault | Apr. 30, 1946 |